(12) United States Patent
Kim et al.

(10) Patent No.: US 11,685,319 B2
(45) Date of Patent: Jun. 27, 2023

(54) DEVICE FOR AUTOMATICALLY ADJUSTING ANGLE OF MONITOR ON VEHICLE SEAT BACK

(71) Applicants: HYUNDAI MOTOR COMPANY, Seoul (KR); KIA CORPORATION, Seoul (KR); HYUNDAI TRANSYS INC., Seosan-si (KR)

(72) Inventors: Sang Ho Kim, Incheon (KR); Byeong Seon Son, Seoul (KR); Tae Hoon Lee, Suwon-si (KR); Ji Hwan Kim, Seoul (KR); Seon Chae Na, Yongin-si (KR); Sang Hoon Park, Incheon (KR); Yun Ho Kim, Osan-si (KR); Won Kee Kim, Suwon-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 60 days.

(21) Appl. No.: 17/360,115

(22) Filed: Jun. 28, 2021

(65) Prior Publication Data
US 2022/0105876 A1    Apr. 7, 2022

(30) Foreign Application Priority Data
Oct. 6, 2020 (KR) ........................ 10-2020-0128541

(51) Int. Cl.
*B60R 11/02* (2006.01)
*B60R 11/00* (2006.01)

(52) U.S. Cl.
CPC ... *B60R 11/0235* (2013.01); *B60R 2011/0015* (2013.01); *B60R 2011/0085* (2013.01); *B60R 2011/0092* (2013.01)

(58) Field of Classification Search
CPC ......... B60R 11/0235; B60R 2011/0015; B60R 2011/0085; B60R 2011/0092
(Continued)

(56) References Cited

U.S. PATENT DOCUMENTS 7,364,230 B2 * 4/2008 Zheng ................ B60R 11/0235
297/188.2
7,959,226 B2 * 6/2011 Hattori ............... B60R 11/0235
297/188.05
(Continued)

FOREIGN PATENT DOCUMENTS

CN    206436931 U    8/2017
JP    2018-002050 A  1/2018
(Continued)

*Primary Examiner* — Terrell L Mckinnon
*Assistant Examiner* — Michael McDuffie
(74) *Attorney, Agent, or Firm* — Lempia Summerfield Katz LLC

(57) ABSTRACT

A device for automatically adjusting an angle of a monitor on a vehicle seat back includes: a fixation bracket on a front seat back upper-frame; a first rotation bracket on an upper portion of the fixation bracket; a second rotation bracket on a lower portion of the fixation bracket; a monitor on a front surface of the first rotation bracket; a motor on a bottom surface of the second rotation bracket; an angle adjustment bar integrally combined with a rear surface of the first rotation bracket; a lead screw, whose lower portion is connected to an output shaft of the motor, and whose upper portion passes through the second rotation bracket; and an ascending and descending member having a threaded hole such that the ascending and descending member fastened to the lead screw while being fastened to an end portion of the angle adjustment bar.

10 Claims, 8 Drawing Sheets

US 11,685,319 B2
Page 2

(58) Field of Classification Search
USPC ... 248/205.1, 220.21, 220.22, 222.14, 274.1, 248/276.1, 284.1, 309.1, 310, 919, 922, 248/923; 297/188.04, 188.05, 217.3, 297/217.4
See application file for complete search history.

(56) References Cited

U.S. PATENT DOCUMENTS

| | | | | |
|---|---|---|---|---|
| 8,172,329 B2 * | 5/2012 | Kim | ...... | B60N 2/853 297/410 |
| 8,523,130 B2 * | 9/2013 | Westerink | ...... | B64D 11/00153 16/365 |
| 8,783,767 B2 * | 7/2014 | Wood | ...... | B60R 11/0235 297/217.4 |
| 8,851,565 B2 * | 10/2014 | Hontz | ...... | A45C 11/00 297/188.06 |
| 9,457,725 B2 * | 10/2016 | McClain | ...... | B60R 11/02 |
| 9,469,255 B2 * | 10/2016 | Kucera | ...... | B60N 2/879 |
| 9,682,662 B2 * | 6/2017 | Vinton | ...... | B60N 2/42 |
| 9,758,076 B2 * | 9/2017 | An | ...... | B60N 2/853 |
| 10,315,546 B2 * | 6/2019 | An | ...... | B60N 2/85 |
| 10,857,951 B2 * | 12/2020 | Shain | ...... | B60R 11/00 |
| 10,875,464 B1 * | 12/2020 | Tsao | ...... | B60R 11/00 |
| 10,960,828 B2 * | 3/2021 | Smith | ...... | B60R 11/0235 |
| 11,135,981 B1 * | 10/2021 | Ziraldo | ...... | B60R 11/0258 |
| 11,225,202 B1 * | 1/2022 | Line | ...... | B60N 2/809 |
| 11,338,740 B1 * | 5/2022 | Gianakopoulos | ... | B60R 11/0235 |
| 11,351,898 B2 * | 6/2022 | Line | ...... | B60N 2/80 |
| 2013/0193290 A1 * | 8/2013 | Lohmann | ...... | F16M 11/08 248/276.1 |
| 2015/0329062 A1 * | 11/2015 | Ackeret | ...... | B60R 11/0241 248/220.22 |

FOREIGN PATENT DOCUMENTS

| | | |
|---|---|---|
| KR | 10-2009-0083988 A | 8/2009 |
| KR | 10-1135139 B1 | 4/2012 |
| KR | 10-2015-0117117 A | 10/2015 |
| KR | 10-1585850 B1 | 1/2016 |

* cited by examiner

FIG. 1 "PRIOR ART"
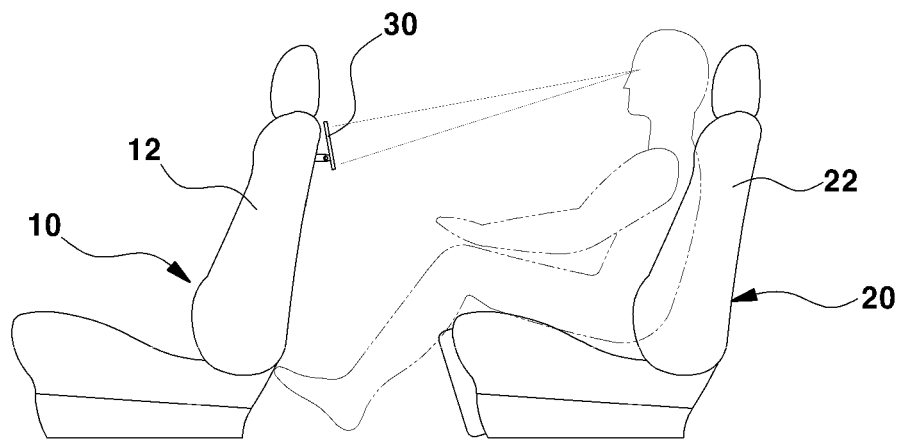
FIG. 2 "PRIOR ART"
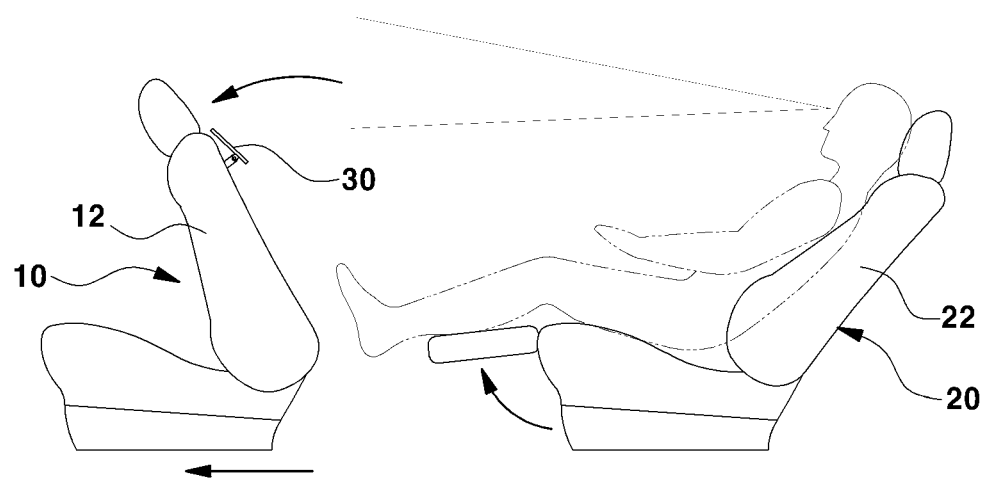

DEVICE FOR AUTOMATICALLY ADJUSTING ANGLE OF MONITOR ON VEHICLE SEAT BACK

CROSS REFERENCE TO RELATED APPLICATION

This application claims priority to and the benefit of Korean Patent Application No. 10-2020-0128541, filed on Oct. 6, 2020, the entire contents of which are incorporated herein by reference.

FIELD

The present disclosure relates to a device for automatically adjusting an angle of a monitor on a vehicle seat back.

BACKGROUND

The statements in this section merely provide background information related to the present disclosure and may not constitute prior art.

With reference to FIGS. 1 and 2, a monitor 30 for an occupant sitting on a rear seat 20 is mounted on a rear surface of a front seat back 12 for a vehicle front seat 10.

As illustrated in FIG. 1, in a state where normal positions of the front seat 10 and the rear seat 20 are maintained, an angle and a height of the monitor 30 are adjusted according to directions of a gaze of an occupant sitting on the rear seat 20. Thus, the occupant has no difficulty in viewing an image on the monitor.

However, as illustrated in FIG. 2, the occupant sitting on the rear seat 20 has a difficulty in viewing an image on the monitor 30 in a state where, a rear seat back 22 for the rear seat 20 is reclined rearward and a leg rest is raised in order for an occupant sitting on the rear seat 20 to keep his/her feet supported and his/her body relaxed, or in a state where the front seat back 12 is pushed frontward in order for the occupant sitting on the rear seat 20 to get a full view in front of the vehicle.

That is, in a state where the occupant sitting on the rear seat 20 keeps his/her feet supported and his/her body relaxed, or in a state where the front seat back 12 is pushed frontward, because the angle and the height of the monitor 30 are not suitable for viewing from a direction of the occupant, the occupant has difficulty in viewing an image on the monitor 30.

Accordingly, the occupant sitting on the rear seat 20 has an inconvenience of rising to his/her feet to manually adjust the angle of the monitor 30.

The foregoing is intended merely to aid in the understanding of the background of the present disclosure, and is not intended to mean that the present disclosure falls within the purview of the related art that is already known to those skilled in the art.

SUMMARY

The present disclosure provides a device for automatically adjusting an angle of a monitor on a vehicle seat back, which is capable of automatically adjusting an angle of a monitor mounted on a front seat back according to directions of a gaze of an occupant sitting on a rear seat. The device is capable of providing the occupant sitting on the rear seat with improved convenience of viewing an image on the monitor from any direction.

According to an aspect of the present disclosure, a device for automatically adjusting an angle of a monitor on a vehicle seat back includes: a fixation bracket mounted on a front seat back upper-frame; a first rotation bracket mounted on an upper portion of the fixation bracket in a manner that is rotatable about a first hinge pin; a second rotation bracket mounted on a lower portion of the fixation bracket in a manner that is rotatable about a second hinge pin; a monitor mounted on a front surface of the first rotation bracket such that the monitor faces in a rearward direction; a motor mounted on a bottom surface of the second rotation bracket; an angle adjustment bar integrally combined with a rear surface of the first rotation bracket; a lead screw that includes a lower portion rotatably connected to an output shaft of the motor, and an upper portion configured to pass through the second rotation bracket; and an ascending and descending member having a threaded hole that engages with a threaded surface of the lead screw. In particular, a rotation of the lead screw causes the ascending and descending member to ascend and descend along the lead screw while being fastened by a hinge mechanism to an end portion of the angle adjustment bar.

In the device, a reinforcement bracket may be mounted in a reinforced manner by welding between the front seat back upper-frame and the fixation bracket.

In the device, the fixation bracket may include: a pair of upper lateral plates, to which the first rotation bracket is mounted in a manner that is rotatable about the first hinge pin; a first mounting plate integrally combined with a front end portion of the upper lateral plate and welded to the reinforcement bracket; a pair of lower lateral plates, to which the second rotation bracket is mounted in a manner that is rotatable about the second hinge pin; a second mounting plate integrally combined with a front end portion of the lower lateral plate and welded to the front seat back upper-frame; and a connection bar connecting upper end portions of the upper lateral plate and the lower lateral plate together.

In the device, the first rotation bracket may include: a monitor mounting plate, on which the monitor is mounted; and first rotation plates integrally combined with both lateral end portions, respectively, of the monitor mounting plate in a manner that protrudes frontward therefrom, the first rotation bracket being mounted on the fixation bracket in a manner that is rotatable about the first hinge pin, and the angle adjustment bar may be integrally combined with a rear surface of the monitor mounting plate in a manner that protrudes therefrom.

In the device, the second rotation bracket may include: a motor mounting plate having a through-hole through which the lead screw passes, the motor being mounted on a bottom surface of the motor mounting plate; and second rotation plates integrally combined with both lateral end portions, respectively, of the motor mounting plate in a manner that protrudes downward, the second rotation plates being mounted on the fixation bracket in a manner that is rotatable about the second hinge pin.

In the device, when the lead screw and the angle adjustment bar make an angle of 90° with respect to each other, a monitor mounting plate on which the monitor is mounted may be held in a neutral position thereof.

In the device, in a state where the monitor mounting plate on which the monitor is mounted is held in the neutral position thereof, when the ascending and descending member ascends with the rotation of the lead screw in a first direction in the same position, and at the same time, the angle adjustment bar is rotated rearward while pulling the lead screw rearward, the lead screw and an upper surface of the angle adjustment bar may make an obtuse angle of greater than 90° with respect to each other and at the same time, the monitor mounting plate on which the monitor is mounted may be rotated rearward.

In the device, in a state where the monitor mounting plate on which the monitor is mounted is held in the neutral position thereof, when the ascending and descending member descends with the rotation of the lead screw in a second direction in the same position, and at the same time, the angle adjustment bar is rotated frontward while pulling the lead screw rearward, the lead screw and an upper surface of the angle adjustment bar may make an acute of smaller than 90° with respect to each other and at the same time, the monitor mounting plate on which the monitor is mounted may be rotated upward in a frontward direction.

The device may further include: a switch mounted in the vicinity of a rear seat to adjust an angle of the monitor; and a controller configured to perform control that causes the motor to produce a rotary motion in a first direction or a second direction.

A device for automatically adjusting an angle of a monitor on a vehicle seat back according to the present disclosure provides the following advantages.

Firstly, an angle of a monitor mounted on a front seat back can be automatically adjusted according to directions of a gaze of an occupant sitting on a rear seat. Thus, an occupant sitting on the rear seat can be provided with an improved convenience of viewing an image on the monitor from any direction.

Secondly, regardless of a posture of the occupant sitting on the rear seat, only with operation of a switch, the angle of the monitor mounted on the front seat back can be adjusted to a desired angle. Thus, the occupant can conveniently view an image on the monitor from any direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a side view illustrating an example where a monitor is mounted on a front seat back;

FIG. 2 is a side view illustrating a state where an angle and a height of the monitor on the front seat back are not suitable for viewing from a direction of an occupant sitting on a rear seat who keeps his/her feet supported and his/her body relaxed;

Figure 7A:
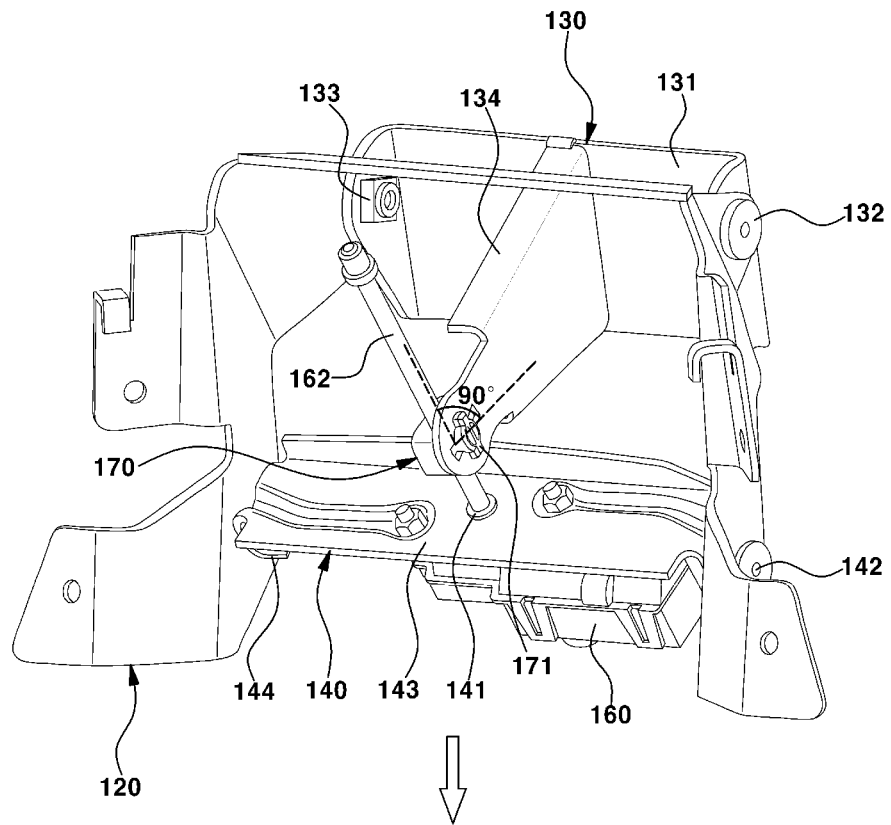
Figure 7B:
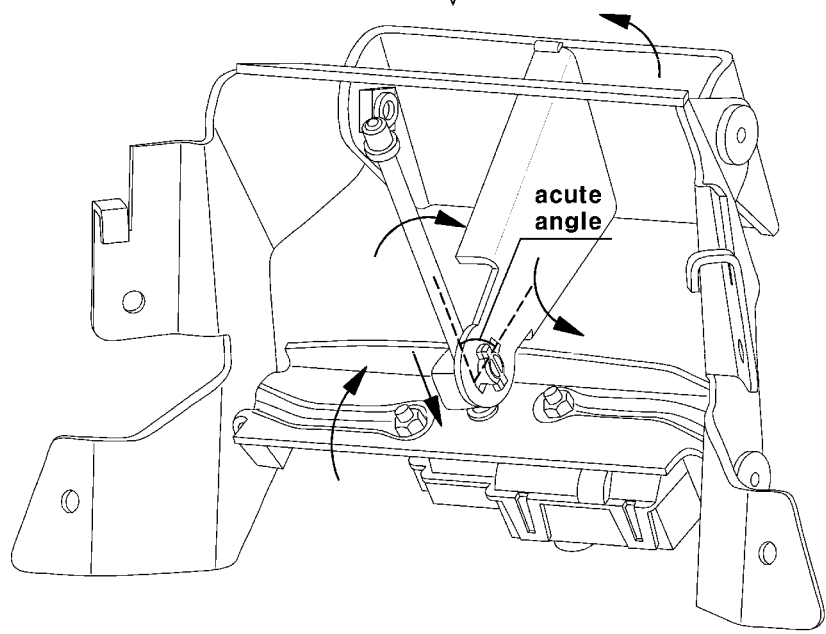
Figure 8A:
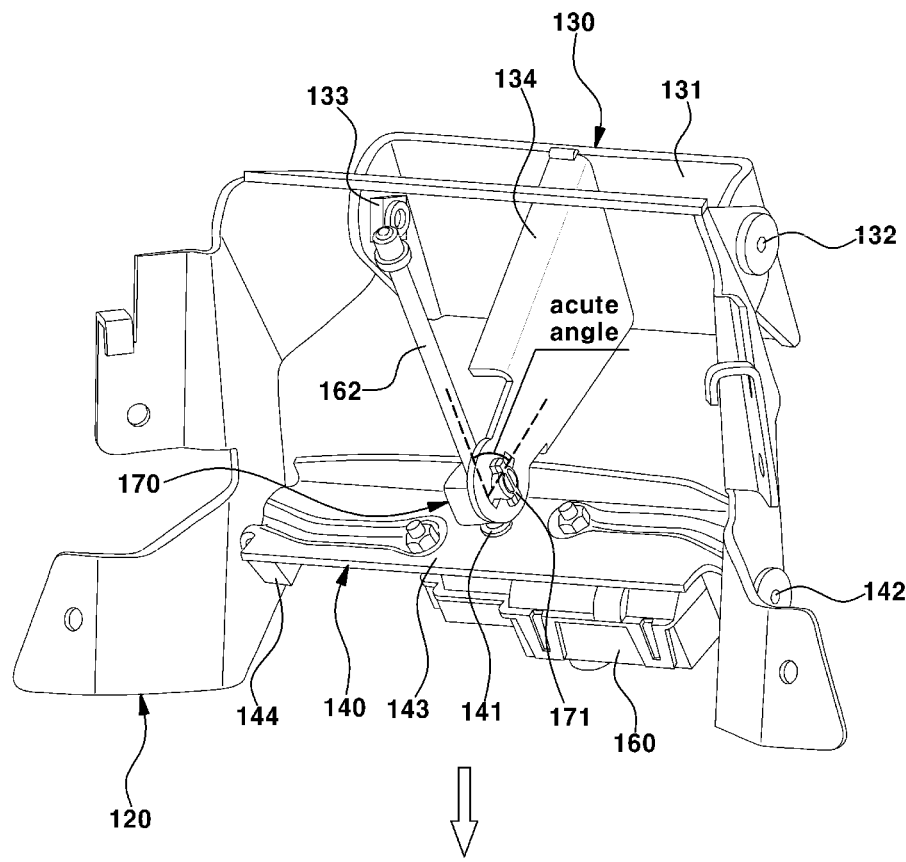
Figure 8B:
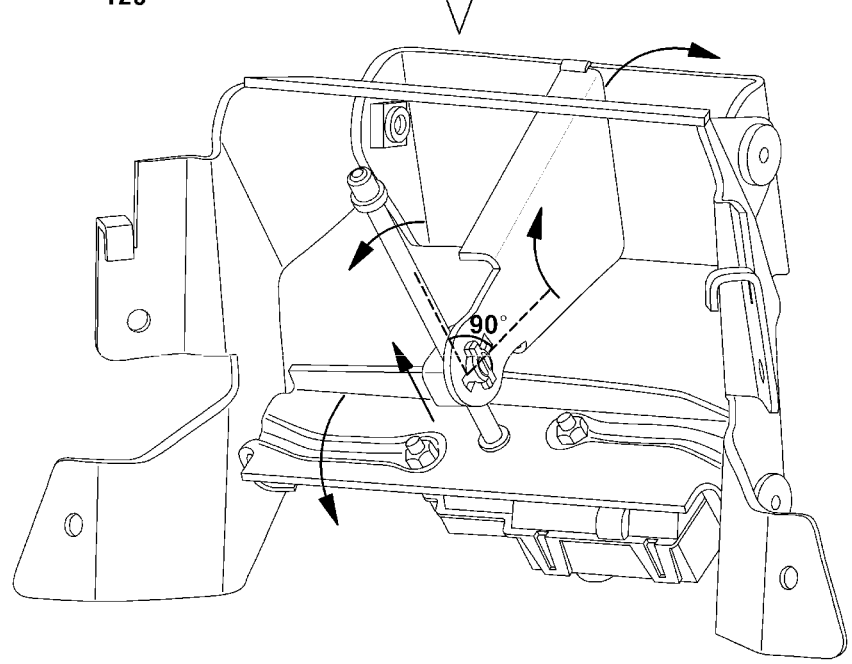

FIG. 7A is a perspective view illustrating a state where the monitor of the device is in the neutral position thereof, and FIG. 7B illustrates a state where the monitor in FIG. 7A is rotated upward to a maximum in the frontward direction in one form of the present disclosure; and FIG. 8A is a perspective view illustrating a state where the monitor of the device is rotated upward to a maximum in the frontward direction as shown in FIG. 7B, and FIG. 8B illustrates a state where the monitor in FIG. 8A returns to the neutral position thereof in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described in detail below with reference to the accompanying drawings.

Figure 3:
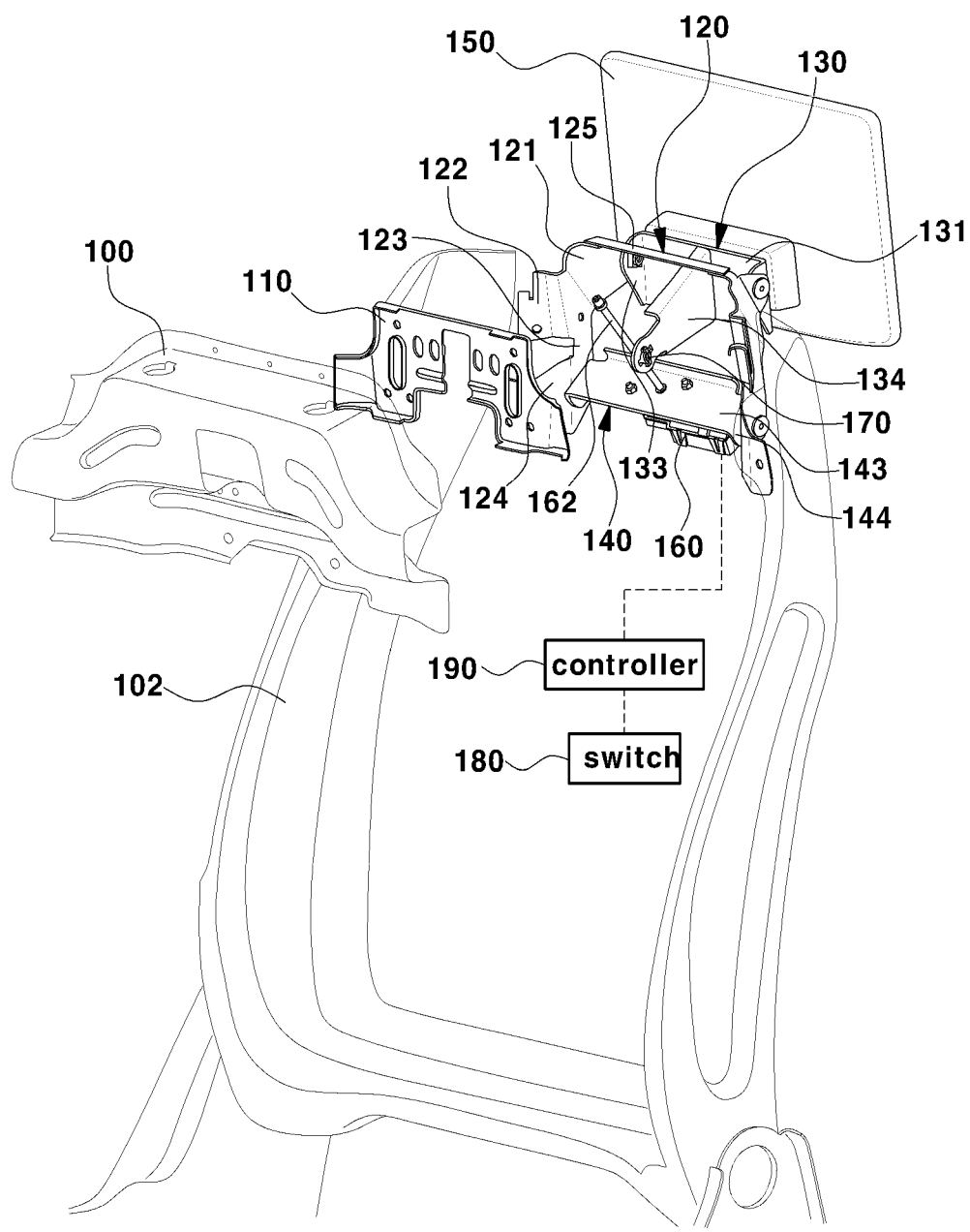
FIG. 3 is a perspective exploded view illustrating a device for automatically adjusting an angle of a monitor on a vehicle seat back according to one form of the present disclosure.
Figure 4A:
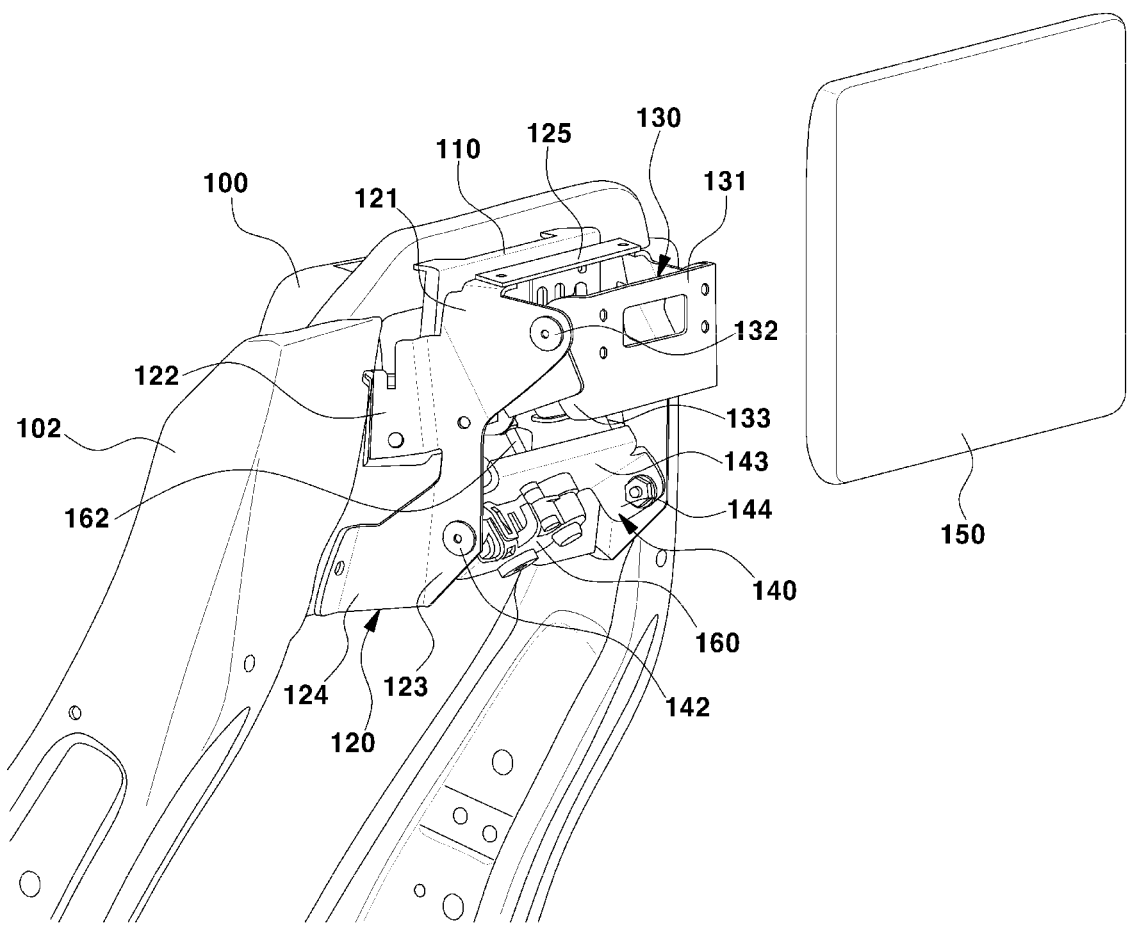
FIGS. 4A and 4B are perspective views each illustrating that the device for automatically adjusting the angle of the monitor on the vehicle seat back according to the present disclosure is assembled.
Figure 4B:
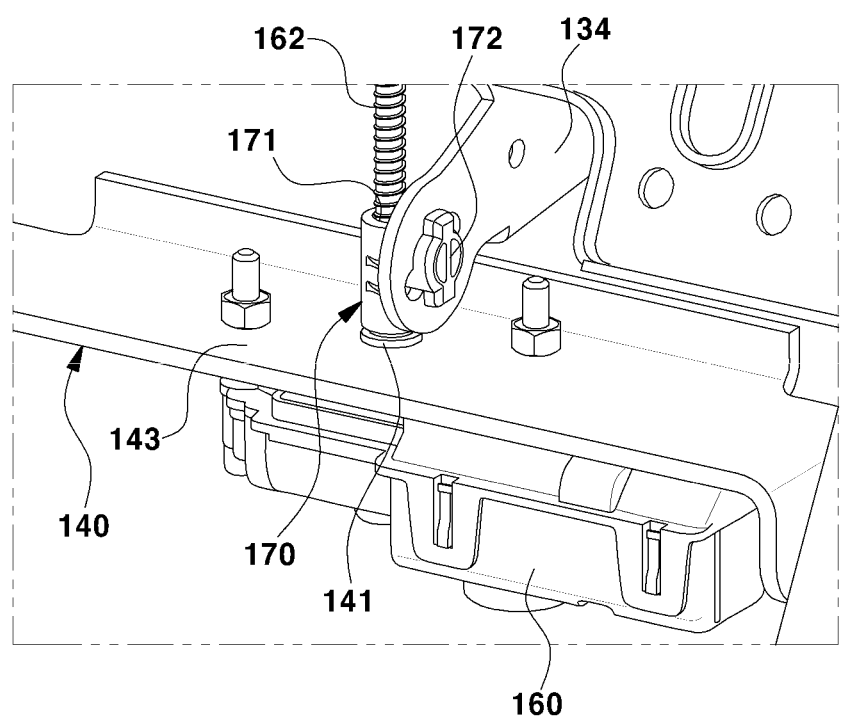

FIGS. 3, 4A, and 4B are perspective views each illustrating a device for automatically adjusting an angle of a monitor on a vehicle seat back according to some forms of the present disclosure. FIGS. 3, 4A, and 4B illustrate a front seat back upper-frame 100.

The front seat back upper-frame 100 is positioned on an upper end portion of the front seat back and is fixed by welding to a front seat back side-frame 102.

A fixation bracket 120 is mounted on the front seat back upper-frame 100. The fixation bracket 120 supports components of the device for automatically adjusting the angle of the monitor.

A first rotation bracket 130 is mounted on an upper portion of the fixation bracket 120 in a manner that is rotatable about a first hinge pin 132. A second rotation bracket 140 is mounted on a lower portion of the fixation bracket 120 in a manner that is rotatable about a second hinge pin 142.

A monitor 150 is mounted on a front surface, facing in a rearward direction (toward a rear seat), of the first rotation bracket 130. An occupant sitting on the rear seat can view an image on the monitor 150.

It is desirable that a reinforcement bracket 110 is mounted, in a reinforced manner, by welding between the front seat back upper-frame 100 and the fixation bracket 120. Thus, the fixation bracket 120 supporting weights of the first rotation bracket 130, the second rotation bracket 140, and the monitor 150 is strongly reinforced.

More specifically, the reinforcement bracket 110 is first welded to the front seat back upper-frame 100, and then, the fixation bracket 120 is welded to the reinforcement bracket 110. Thus, the front seat back upper-frame 100 is strongly reinforced. At the same time, the fixation bracket 120, which supports the components of the device for automatically adjusting the angle of the monitor, is strongly reinforced for support. The components include the first rotation bracket 130, the second rotation bracket 140, the monitor 150, and the like.

To this end, the fixation bracket 120 includes a pair of upper lateral plates 121, a first mounting plate 122, a pair of lower lateral plates 123, a second mounting plate 124, and a connection bar 125. The first rotation bracket 130 is mounted on the pair of upper lateral plates 121 in a manner that is rotatable about the first hinge pin 132. The first mounting plate 122, integrally combined with a front end portion of the upper lateral plate 121, is welded to the reinforcement bracket 110. The second rotation bracket 140 is mounted on the pair of lower lateral plates 123 in a manner that is rotatable about the second hinge pin 142. The second mounting plate 124, integrally combined with a front end portion of the lower lateral plate 123, is welded to the front seat back upper-frame 100. The connection bar 125 connects upper end portions of the upper lateral plate 121 and the lower lateral plate 123 together.

An angle adjustment bar 134 for adjusting the angle of the monitor 150 by rotating the first rotation bracket 130 is integrally with a rear surface of the first rotation bracket 130 in a manner that protrudes frontward therefrom.

More specifically, the first rotation bracket 130 includes a monitor mounting plate 131 and first rotation plates 133. The monitor 150 is mounted on the monitor mounting plate 131. The first rotation plates 133 are integrally combined with both lateral end portions, respectively, of the monitor mounting plate 131 in a manner that protrudes frontward therefrom. The first rotation plates 133 are mounted on the fixation bracket 120 in a manner that is rotatable about the first hinge pin 132. The angle adjustment bar 134 is integrally combined with a rear surface of the monitor mounting plate 131 in a manner that protrudes therefrom.

A motor 160 is mounted on a bottom surface of the second rotation bracket 140 that has a structure for supporting a lead screw 162 extending from an output shaft of the motor 160.

In one form, the second rotation bracket 140 includes a motor mounting plate 143 and second rotation plates 144. The motor 160 is mounted on a bottom surface of the motor mounting plate 143 that has a through-hole 141 through which the lead screw 162 passes. The second rotation plates 144 are integrally combined with both lateral end portions, respectively, of the motor mounting plate 143 in a manner that protrudes downward. The second rotation plates 144 are mounted on the fixation bracket 120 in a manner that is rotatable about the second hinge pin 142.

A lower end portion of the lead screw 162 is connected to the output shaft of the motor 160 in a manner that is rotatable in the same position, and a lower end portion thereof passes through the through-hole 141 in the second rotation bracket 140 in a manner that extends upward.

It is desirable that a well-known gear box including a worm gear, a worm wheel, and the like is mounted on one side of the motor 160. The worm gear is to be connected to the output shaft of the motor 160. The worm wheel is to be engaged with the lead screw 162. A rotary motion of the worm gear connected to the output shaft of the motor 160 is transferred to the worm wheel, and thus the worm wheel is rotated. The rotation of the worm wheel in return rotates the lead screw 162 in the same position.

Particularly, an upper portion of the lead screw 162, that is, an upper portion thereof that extends upward after passing through the through-hole 141 in the second rotation bracket 140 is screwed into an ascending and descending member 170 so that the ascending and descending member 170 is ascendable and descendible.

More specifically, as illustrated in FIG. 4B, the ascending and descending member 170, which is pipe-shaped, has a threaded hole 171 in an internal surface thereof and has a hinge end 172 on a lateral side thereof. The lead screw 162 is screwed into the threaded hole 171. The hinge portion 172 is fastened by a hinge mechanism to an end portion of the angle adjustment bar 134 integrally combined with the first rotation bracket 130.

The device for automatically adjusting the angle of the monitor according to one form of the present disclosure may further include a switch 180 and a controller 190. The switch 180 is operable by a user. The controller 190 controls operation of the motor 160 according to an operation signal of the switch 180.

It is desirable that the switch 180 is mounted on an armrest adjacent to the rear seat in a manner that is operable by an occupant sitting on the rear seat, and that, according to the operation signal of the switch 180, the controller 190 performs control that causes the motor 160 to produce a rotary motion in a first direction or a second direction.

Alternatively, a motor-driven seat includes a motor (not illustrated) for rotating the front seat back frontward and a motor (not illustrated) for reclining a rear seat rearward. The controller 190 receives a Hall sensor signal of one of the motor for pushing the front seat back frontward and the motor for reclining a rear seat back rearward. When it is determined that an angle by which the front seat back or the rear seat back is rotated frontward or reclined rearward is equal to or greater than a reference angle, the controller 190 applies a drive signal to the motor 160 in order to adjust the angle of the monitor 150.

Components that constitute the device for automatically adjusting the angle of the monitor are arranged in a manner that is hidden from view by a backboard mounted on a rear surface of the seat back. Only the monitor 150 is exposed through a rear surface of the seat back.

An operation flow for the device for automatically adjusting the angle of the monitor according to the present disclosure, which is configured as described, will be described below.

Figure 5A:
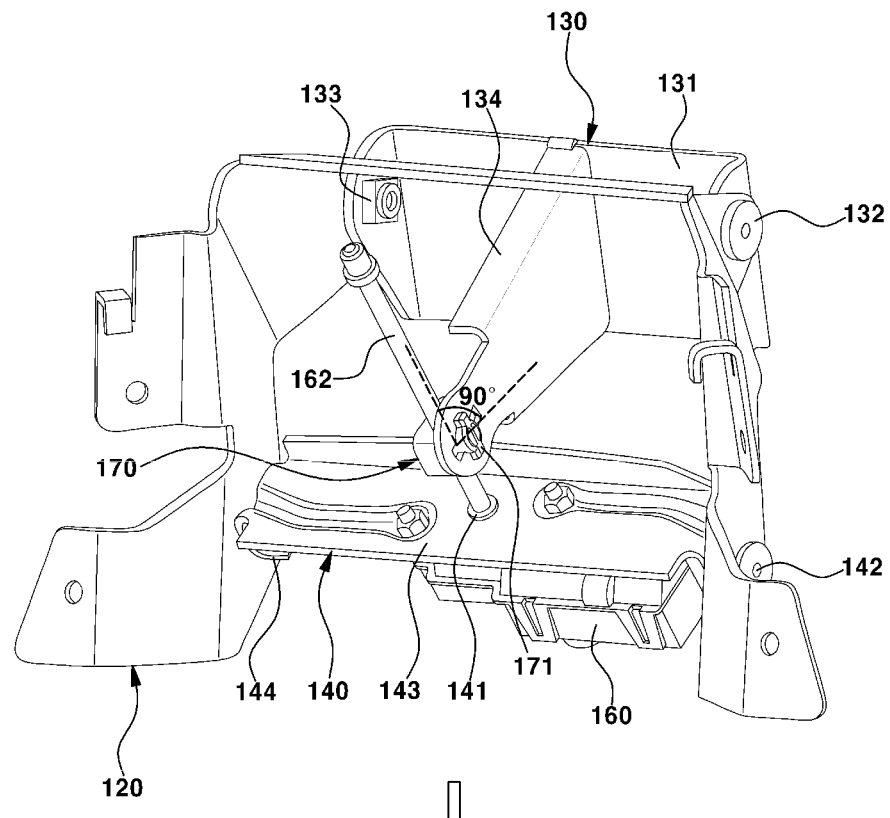
FIG. 5A is a perspective view illustrating a state where the monitor of the device is in the neutral position thereof in one form of the present disclosure.
Figure 5B:
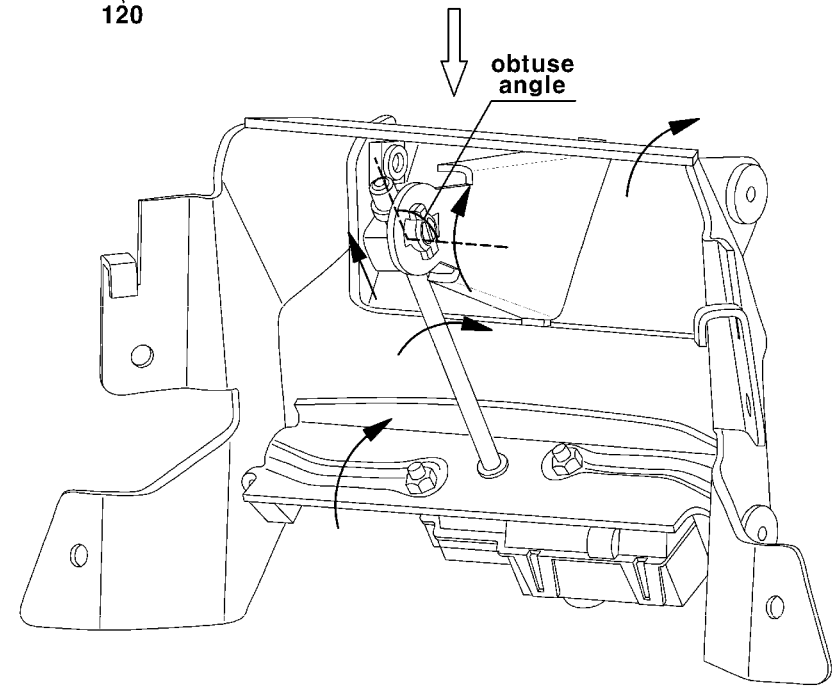
FIG. 5B is a perspective view illustrating a state where the monitor in FIG. 5A is rotated downward to a maximum in the rearward direction from the neutral position illustrated in FIG. 5A.
Figure 6A:
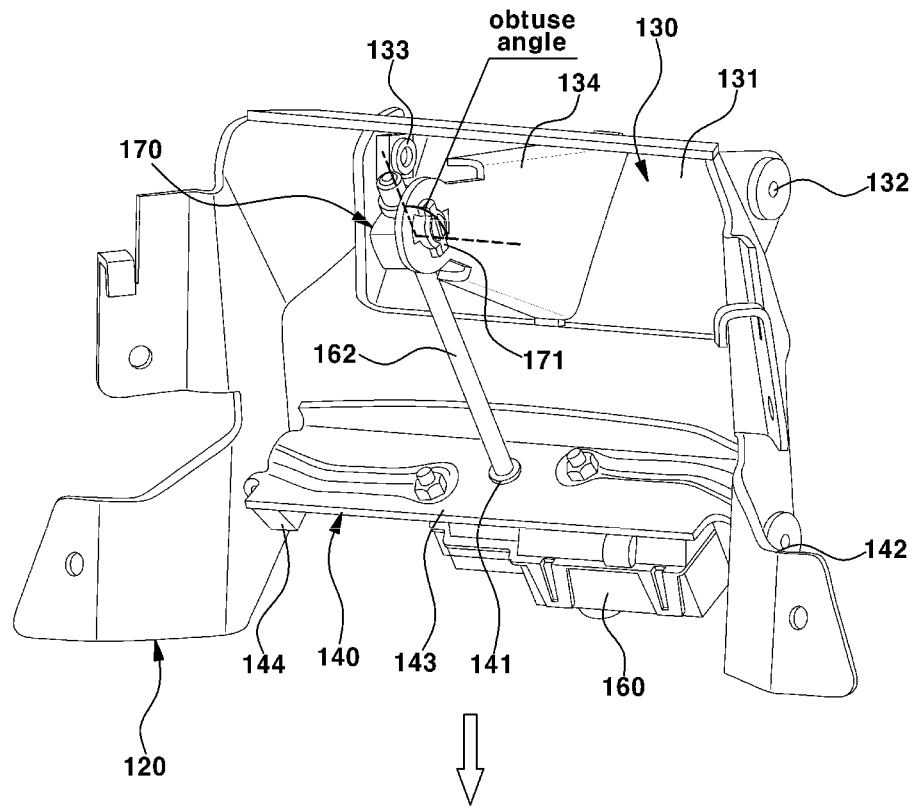
FIG. 6A is a perspective view illustrating a state where the monitor of the device is rotated downward to a maximum in the rearward direction as illustrated in FIG. 5B.
Figure 6B:
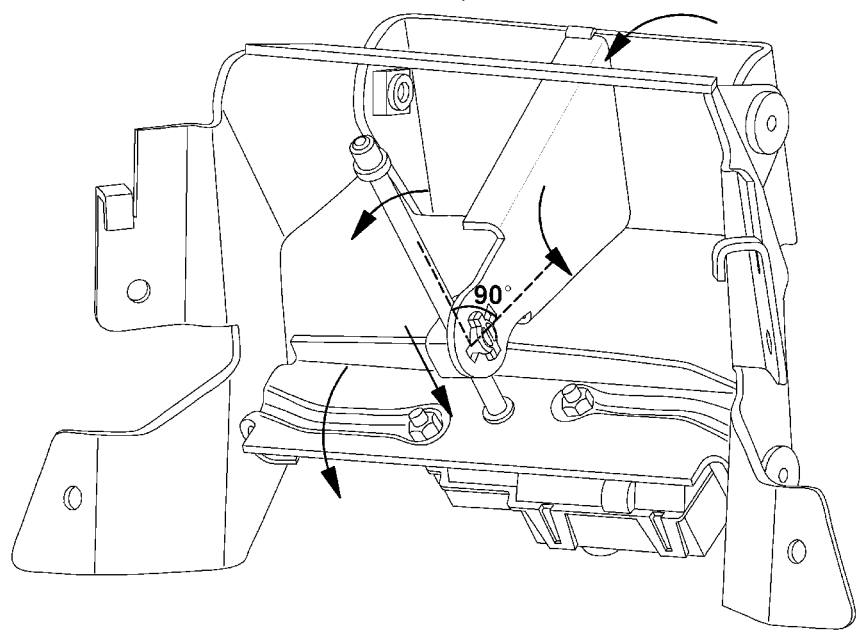
FIG. 6B illustrates a state where the monitor in FIG. 6A returns to the neutral position thereof in one form of the present disclosure.

FIGS. 5A and 5B illustrate an operation state where the monitor 150 in the neutral position thereof is rotated downward to a maximum in the rearward direction. FIGS. 6A and 6B illustrate an operation state where the monitor 150 rotated downward to a maximum returns to the neutral position thereof.

When the angle adjustment bar 134 mounted on the rear surface of the monitor mounting plate 131 that constitutes the first rotation bracket 130, and the lead screw 162 make an angle of 90° with respect to each other, a dead point is created beyond which the second rotation bracket 140 cannot be rotated frontward. At this dead point, the monitor 150 mounted on the monitor mounting plate 131, as well as the monitor mounting plate 131, is held in the neutral position thereof.

In a state where the monitor 150 is held in the neutral position thereof where the monitor 150 cannot be rotated upward or downward, when an occupant sitting on the rear seat keeps his/her feet supported and his/her body relaxed, or when the front seat back is pushed frontward, the angle and the height of the monitor is not suitable for viewing from a direction of the occupant. Thus, the occupant can properly view an image on the monitor.

Accordingly, there is a need to rotate the monitor 150 downward, for angle adjustment, in the rearward direction.

To this end, when a user operates the switch 180 to rotate the monitor 150 downward, for angle adjustment, in the rearward direction, the controller 190 performs control that causes the motor 160 to produce the rotary motion in the first direction.

Subsequently, when with the rotary motion in the first direction, produced by the motor 160, the lead screw 162 is rotated in the first direction in the same position, the ascending and descending member 170 ascends along the lead screw 162.

At the same time, as illustrated in FIGS. 5A-5B, the angle adjustment bar 134 connected by the hinge mechanism to the ascending and descending member 170 ascends, being rotated rearward and at the same time pulling the lead screw 162 rearward (toward the rear seat). Thus, the lead screw 162 and an upper surface of the angle adjustment bar 134 make an obtuse angle of greater than 90°, with respect to each other. At the same time, the first rotation bracket 130 and the second rotation bracket 140 are rotated downward by a predetermined angle in the rearward direction.

The downward rotation of the first rotation bracket 130 in the rearward direction, in turn, rotates the monitor mounting plate 131 of the first rotation bracket 130 downward in the rearward direction. Thus, for angle adjustment, the monitor 150 mounted on the monitor mounting plate 131 is rotated by the same angle as the monitor mounting plate 131 is rotated downward in the rearward direction.

On the other hand, in a case where the monitor 150 is rotated downward, for angle adjustment, in the rearward direction and then needs to return to the neutral position thereof, the controller 190 that receives a signal of the switch 180 operated by the user performs control that causes the motor 160 to produce the rotary motion in the second direction.

Subsequently, when with the rotary motion in the second direction, produced by the motor 160, the lead screw 162 is rotated in the second direction in the same position, the ascending and descending member 170 descends along the lead screw 162.

At the same time, as illustrated in FIGS. 6A-6B, the angle adjustment bar 134 connected by the hinge mechanism to the ascending and descending member 170 descends, being rotated downward in a frontward direction and at the same time pushing the lead screw 162 frontward. Thus, the lead screw 162 and the upper surface of the angle adjustment bar 134 make an angle of 90° with respect to each other. At the same time, the first rotation bracket 130 and the second rotation bracket 140 are rotated upward by a predetermined angle in the frontward direction.

On the other hand, in a case where the monitor 150 is rotated downward, for angle adjustment, in the rearward direction and then needs to return to the neutral position thereof, the upward rotation of the first rotation bracket 130 by a predetermined angle in the frontward direction, in return, rotates the monitor mounting plate 131 of the first rotation bracket 130 by the same angle in the frontward direction. Thus, the monitor 150 mounted on the monitor mounting plate 131 returns to the neutral position thereof.

FIGS. 7A-7B illustrate an operation state where the monitor 150 in the neutral position thereof is rotated upward to a maximum in the frontward direction. FIGS. 8A-8B illustrate an operation state where the monitor 150 rotated upward to a maximum in the frontward direction returns to the neutral position thereof.

As described above, when the angle adjustment bar 134 mounted on the rear surface of the monitor mounting plate 131 that constitutes the first rotation bracket 130, and the lead screw 162 make an angle of 90° with respect to each other, the dead point is created beyond which the second rotation bracket 140 cannot be rotated frontward. At this dead point, the monitor 150 mounted on the monitor mounting plate 131, as well as the monitor mounting plate 131, is held in the neutral position thereof.

In the state where the monitor 150 is held in the neutral position thereof where the monitor 150 cannot be rotated upward or downward, the angle and the height of the monitor 150 may not be suitable for viewing from the direction of the occupant. In this case, for angle adjustment, the monitor 150 needs to be rotated upward in the frontward direction. When the user operates the switch 180 to rotate the monitor 150 upward in the frontward direction for angle arrangement, the controller 190 performs control that causes the motor 160 to produce the rotary motion in the second direction.

Subsequently, when with the rotary motion in the second direction, produced by the motor 160, the lead screw 162 is rotated in the second direction in the same position, the ascending and descending member 170 descends along the lead screw 162.

At the same time, as illustrated in FIGS. 7A-7B, the angle adjustment bar 134 connected by the hinge mechanism to the ascending and descending member 170 descends, being rotated frontward and at the same time pulling the lead screw 162 rearward (toward the rear seat). Thus, the lead screw 162 and the upper surface of the angle adjustment bar 134 make an acute angle of smaller than 90° with respect to each other. At the same time, the first rotation bracket 130 and the second rotation bracket 140 are rotated upward by a predetermined angle in the frontward direction.

The upward rotation of the first rotation bracket 130 in the frontward direction, in turn, rotates the monitor mounting plate 131 of the first rotation bracket 130 upward in the frontward direction. Thus, for angle adjustment, the monitor 150 mounted on the monitor mounting plate 131 is rotated by the same angle as the monitor mounting plate 131 is rotated upward in the frontward direction.

On the other hand, in a case where the monitor 150 is rotated upward, for angle adjustment, in the frontward direction and then needs to return to the neutral position thereof, the controller 190 that receives a signal of the switch 180 operated by the user performs control that causes the motor 160 to produce the rotary motion in the first direction.

Subsequently, when with the rotary motion in the first direction, produced by the motor 160, the lead screw 162 is rotated in the first direction in the same position, the ascending and descending member 170 ascends along the lead screw 162.

At the same time, as illustrated in FIGS. 8A-8B, the angle adjustment bar 134 connected by the hinge mechanism to the ascending and descending member 170 ascends, being rotated rearward and at the same time pushing the lead screw 162 frontward. Thus, the lead screw 162 and the upper surface of the angle adjustment bar 134 make an angle of 90° with respect to each other. At the same time, the first rotation bracket 130 and the second rotation bracket 140 are rotated downward by a predetermined angle in the rearward direction.

On the other hand, in a case where the monitor 150 is rotated upward, for angle adjustment, in the frontward direction and then needs to return to the neutral position thereof, the downward rotation of the first rotation bracket 130 by a predetermined angle in the rearward direction, in return, rotates the monitor mounting plate 131 of the first rotation bracket 130 rearward by the same angle. Thus, the monitor 150 mounted on the monitor mounting plate 131 returns to the neutral position thereof.

In this manner, regardless of a posture of an occupant sitting on the rear seat, only with the operation of the switch 180, the angle of the monitor 150 can be adjusted to a desired angle. Thus, the occupant can conveniently view an image on the monitor 30 from any direction.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A device for automatically adjusting an angle of a monitor on a vehicle seat back, the device comprising:
   a fixation bracket mounted on a front seat back upper-frame;
   a first rotation bracket rotatably mounted on an upper portion of the fixation bracket via a first hinge pin;
   a second rotation bracket rotatably mounted on a lower portion of the fixation bracket via a second hinge pin;
   a monitor mounted on a front surface of the first rotation bracket such that the monitor faces in a rearward direction;
   a motor mounted on a bottom surface of the second rotation bracket;
   an angle adjustment bar integrally combined with a rear surface of the first rotation bracket;
   a lead screw including: a lower portion rotatably connected to an output shaft of the motor, and an upper portion configured to pass through the second rotation bracket; and
   an ascending and descending member having a threaded hole configured to engage with a threaded surface of the lead screw,
   wherein a rotation of the lead screw is configured to cause the ascending and descending member to ascend and descend along the lead screw while being fastened by a hinge portion to an end portion of the angle adjustment bar.

2. The device of claim 1, wherein a reinforcement bracket is mounted between the front seat back upper-frame and the fixation bracket.

3. The device of claim 2, wherein the fixation bracket comprises:
   a pair of upper lateral plates, to which the first rotation bracket is rotatably mounted about the first hinge pin;
   a first mounting plate integrally combined with a front end portion of the pair of upper lateral plates and welded to the reinforcement bracket;
   a pair of lower lateral plates, to which the second rotation bracket is rotatably mounted about the second hinge pin;
   a second mounting plate integrally combined with a front end portion of the pair of lower lateral plates and welded to the front seat back upper-frame; and
   a connection bar configured to connect upper end portions of the pair of upper lateral plates and the pair of lower lateral plates together.

4. The device of claim 1, wherein the first rotation bracket comprises:
   a monitor mounting plate on which the monitor is mounted; and
   first rotation plates integrally respectively combined with both lateral end portions of the monitor mounting plate in a manner that protrudes frontward therefrom, the first rotation plates configured to be rotatably mounted on the fixation bracket via the first hinge pin, and
   the angle adjustment bar is integrally combined with a rear surface of the monitor mounting plate in a manner that protrudes therefrom.

5. The device of claim 1, wherein the second rotation bracket comprises:
   a motor mounting plate having a through-hole through which the lead screw passes, the motor being mounted on a bottom surface of the motor mounting plate; and
   a second rotation plates integrally respectively combined with both lateral end portions of the motor mounting plate in a manner that protrudes downward, the second rotation plates configured to be rotatably mounted on the fixation bracket via the second hinge pin.

6. The device of claim 1, wherein when the lead screw and the angle adjustment bar make an angle of 90 degrees with respect to each other, a monitor mounting plate on which the monitor is mounted is held in a neutral position thereof.

7. The device of claim 6, wherein, in a state where the monitor mounting plate is held in the neutral position, when the ascending and descending member ascends with the rotation of the lead screw in a first direction in the same position, and the angle adjustment bar is rotated rearward while pulling rearward the lead screw, the lead screw and an upper surface of the angle adjustment bar are configured to form an obtuse angle greater than 90 degrees with respect to each other and at the same time, the monitor mounting plate is rotated downward in the rearward direction.

8. The device of claim 6, wherein, in a state where the monitor mounting plate is held in the neutral position, when the ascending and descending member descends with the rotation of the lead screw in a second direction in the same position, and the angle adjustment bar is rotated frontward while pulling rearward the lead screw, the lead screw and an upper surface of the angle adjustment bar are configured to form an acute angle smaller than 90 degrees with respect to each other and the monitor mounting plate is rotated upward in a frontward direction.

9. The device of claim 1, further comprising:
   a switch mounted in vicinity of a rear seat to adjust an angle of the monitor; and
   a controller configured to perform a control that causes the motor to produce a rotary motion in a first direction or a second direction.

10. The device of claim 9, wherein the controller is configured to receive a Hall sensor signal of a motor for rotating a front seat back frontward or a Hall sensor signal of the motor for reclining a rear seat back rearward, and, when it is determined that an angle by which the front seat back or the rear seat back is rotated frontward or reclined rearward is equal to or greater than a reference angle, the controller is configured to apply a drive signal to the motor for adjusting the angle of the monitor.

* * * * *